(12) United States Patent
Patel et al.

(10) Patent No.: US 9,369,169 B2
(45) Date of Patent: Jun. 14, 2016

(54) METHOD AND APPARATUS FOR AN ADD-ON COMMUNICATION DEVICE

(71) Applicant: MBIT WIRELESS, INC., Newport Beach, CA (US)

(72) Inventors: Bhaskar Patel, San Clemente, CA (US); Arumugam Govindswamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 0 days.

(21) Appl. No.: 14/462,636

(22) Filed: Aug. 19, 2014

(65) Prior Publication Data

US 2015/0050961 A1 Feb. 19, 2015

Related U.S. Application Data

(60) Provisional application No. 61/867,249, filed on Aug. 19, 2013.

(51) Int. Cl.
*H04B 1/38* (2015.01)
*H04B 1/3888* (2015.01)
*H04M 1/02* (2006.01)
*H04M 1/725* (2006.01)

(52) U.S. Cl.
CPC ........... *H04B 1/3888* (2013.01); *H04M 1/0202* (2013.01); *H04M 1/0256* (2013.01); *H04M 1/72575* (2013.01)

(58) Field of Classification Search
CPC . H04B 1/3888; H04N 1/0202; H04N 1/0256; H04N 1/72575
USPC ................ 455/557, 575.8, 575.1, 556.1, 558, 455/552.1; 361/679.01, 679; 427/58; 29/401.1, 729, 428; 224/191; 206/320, 206/472; 150/154; 264/272.11
See application file for complete search history.

(56) References Cited

U.S. PATENT DOCUMENTS

| | | | | |
|---|---|---|---|---|
| 7,593,723 | B2 * | 9/2009 | Zarom | G06F 1/1615 455/41.2 |
| 8,509,865 | B1 * | 8/2013 | LaColla | H04M 1/04 455/556.1 |
| 2003/0190927 | A1 * | 10/2003 | Leong | H04B 1/3816 455/525 |
| 2004/0029581 | A1 * | 2/2004 | Lu | H04M 1/7253 455/426.1 |
| 2005/0101350 | A1 * | 5/2005 | Wang | H04B 1/005 455/558 |
| 2007/0042767 | A1 * | 2/2007 | Stepanian | G06F 1/1626 455/420 |

(Continued)

*Primary Examiner* — Tan H Trinh
(74) *Attorney, Agent, or Firm* — Lerner, David, Littenberg, Krumholz & Mentlik, LLP

(57) ABSTRACT

A cover for a portable consumer electronic device is provided with an integrated mobile communication device. The integrated mobile communication device enables decoupling of the consumer electronics device from the modem used for wireless communication. This enables the certification and approval of the end consumer electronic device and the mobile wireless communication modem device to be done separately, and also enables the replacement of the mobile wireless communication modem device in an easier and less expensive manner. The user can choose among different wireless communication technologies such as 2G/3G/4G, as well as service from different network operators, without tying up the consumer electronic device with any particular mobile wireless communication modem technology or network operator. The cover includes a connector for connection between the integrated mobile communication device and the batter of the consumer electronic device. The cover may also include a backup battery for use by the consumer device.

15 Claims, 2 Drawing Sheets

(56) References Cited

U.S. PATENT DOCUMENTS

| | | | | |
|---|---|---|---|---|
| 2007/0081303 A1* | 4/2007 | Lam | G06F 1/1626 | 361/679.4 |
| 2008/0090564 A1* | 4/2008 | Najafi | H04W 8/20 | 455/425 |
| 2009/0083060 A1* | 3/2009 | Sherman | G06Q 30/06 | 705/1.1 |
| 2010/0060604 A1* | 3/2010 | Zwart | G06F 1/1601 | 345/173 |
| 2010/0078343 A1* | 4/2010 | Hoellwarth | B29C 45/14639 | 206/320 |
| 2011/0202783 A1* | 8/2011 | Venkatakrishnan | G06Q 50/06 | 713/340 |
| 2011/0230178 A1* | 9/2011 | Jones | H04M 1/0235 | 455/422.1 |
| 2012/0088559 A1* | 4/2012 | McSweyn | H04M 1/0283 | 455/575.1 |
| 2012/0206303 A1* | 8/2012 | Desclos | H01Q 1/243 | 343/702 |
| 2012/0289291 A1* | 11/2012 | Moran | H04M 1/0256 | 455/566 |
| 2012/0329524 A1* | 12/2012 | Kent | G06F 3/044 | 455/566 |
| 2013/0052294 A1* | 2/2013 | Wang | B29C 33/3857 | 425/385 |
| 2013/0146491 A1* | 6/2013 | Ghali | G06F 1/1626 | 206/320 |
| 2013/0296004 A1* | 11/2013 | Tages | H05K 5/03 | 455/575.8 |
| 2013/0335898 A1* | 12/2013 | Stevens | H05K 13/00 | 361/679.01 |
| 2014/0087788 A1* | 3/2014 | Filipovic | H04B 1/3888 | 455/557 |
| 2015/0076187 A1* | 3/2015 | Cohen | A45C 15/00 | 224/191 |
| 2015/0237191 A1* | 8/2015 | Moran | H04M 1/0256 | 455/556.1 |

* cited by examiner

METHOD AND APPARATUS FOR AN ADD-ON COMMUNICATION DEVICE

CROSS-REFERENCE TO RELATED APPLICATIONS

This application claims the benefit of the filing date of U.S. Provisional Application No. 61/867,249, filed Aug. 19, 2013 and entitled "METHOD AND APPARATUS FOR AN ADD-ON COMMUNICATION DEVICE," the entire disclosure of which is hereby expressly incorporated by reference herein.

BACKGROUND OF THE INVENTION

Smartphones, tablets and laptops are one of the widely used consumer electronics devices with a number of hardware and software features. One of the key features of these devices is the ability to communicate wirelessly. There are multiple wireless communication options suitable for different range and purposes. For example, Bluetooth is commonly used for communication over a very short distance, such as a distance of few meters. Wi-Fi is commonly used for communication over a distance in the range of about 10 meters from the access point. The mobile wireless communication technologies such as 2G/3G/4G are used to communicate over a range of kilometers.

The Bluetooth and Wi-Fi technologies are relatively lower complexity hardware and are sometimes considered as baseline features and are usually integrated into the primary consumer electronics product. On the other hand, the mobile communication modem may be an optional item that can be installed at the factory or by the user depending on the particular type of consumer device. For example, with Smartphones usually the mobile communication modem is always integrated as part of the phone. On the other hand, for tablets and laptops, the mobile communication modem may be an optional item.

For mobile wireless communication, the user needs to get subscription from a service provider. Often users do not stick to one service provider for a long period of time although they may continue to use the same consumer electronics device such as a Smartphone, a tablet or a laptop over a longer period of time. Also, in some consumer electronics devices, users may not have opted to purchase the mobile communication modem during initial purchase but subsequently may choose to add that functionality. Furthermore, the user may wish to transition to newer technologies such as 4G.

Often mobile wireless communication modems in the USB dongle form factor are available as a separate device and can be used with tablets, laptops and other consumer electronics devices to get mobile wireless communication capability. In some consumer electronics devices, these mobile wireless communication modems can be used by connecting them into an available USB port on the consumer electronics device such as a laptop or tablet. While the USB dongle addresses some of the issues mentioned above, it is not a practical solution in many cases since it sticks out of the consumer electronics device, may have power supply limitations, and other performance issues.

SUMMARY OF THE INVENTION

Many consumer electronics devices use covers to protect the device. The covers are generally considered an accessory and may not be required to go through rigorous certification normally performed for the primary consumer electronics device. At the same time the covers can be considered part of the consumer electronics device since during use the covers are always wrapped around the device such that there is nothing sticking out the way, for example, a USB dongle does. Similarly, there are many other accessories available for consumer electronics devices such as a spare or extended battery that can be considered as integral part of the device.

Most modern consumer electronic devices are highly complex devices that require multiple certifications and regulatory approvals. The time and cost of integrating and performing the required testing to meet the certification requirements are very high. These factors often inhibit the integration of new features into the device. One of the key features of many consumer electronic devices such as smartphones, tablets, laptops, gaming consoles, cameras, video camcorders, etc. is the ability to communicate wirelessly using wireless modems with variety of cellular technologies such as 2G/3G/4G.

Integrating the mobile wireless communication modems in a consumer electronic device often increases complexity significantly. The integration, certification, regulatory and performance requirements for these mobile wireless communication modems is one of the most complex, expensive, challenging and time consuming tasks in the development of the consumer product. Also integrating the mobile wireless communication modem with the consumer electronic device often restricts the consumer electronic device to a particular network operator or a set of network operators.

A method and apparatus are disclosed that enable the decoupling of the end consumer electronics device from the mobile wireless communication modem used for wireless communication. This enables the certification and approval of the end consumer electronic device and the mobile wireless communication modem device to be done separately. This method also enables the replacement of a mobile wireless communication modem device easier and less expensive. This method provides the ability to use different mobile wireless communication modem technologies such as 2G/3G/4G as well as service from different network operators without tying up the primary consumer electronic device with any particular mobile wireless communication modem technology or network operator.

In accordance with one aspect of the invention, a cover for use with a consumer electronics device is provided. The cover comprises a housing shell, a wireless communications modem and a power connector. The housing shell is arranged to at least partially wrap around the consumer electronics device, and is removably affixable to the consumer electronics device. The wireless communications modem is integrally formed with the housing shell, and is configured to enable wireless communication between a processor of the consumer electronics device and a remote network. The power connector is disposed on the housing shell, and is configured to provide a power connection between a power supply of the consumer electronics device and the wireless communications modem.

According to one example, the wireless communication modem is connectable to the processor of the consumer electronics device with a wireless interface. Alternatively, the wireless communication modem is connectable to the processor of the consumer electronics device with a wired interface. Here, the power connector may include signal wires for the wired interface.

According to another example, the wireless communication modem includes one or more antennas disposed along the housing shell. In another example, the cover further includes a spare battery usable by the consumer electronics device when the housing shell is affixed to the consumer electronics device. In this case, the spare battery may be configured to power the wireless communications modem to enable the wireless communications modem to communicate with the processor of the consumer electronics device when the housing shell is not affixed to and is separated from the consumer electronics device. Optionally, the cover further includes a display to indicate battery level for the spare batter and a mobile network signal level.

In accordance with another aspect of the invention, the wireless communications modem may comprise a flexible printed circuit board that fits along the housing shell.

And in accordance with further aspects of the invention, the cover and the consumer electronics device may be provided as a kit.

DETAILED DESCRIPTION

Figure 1:
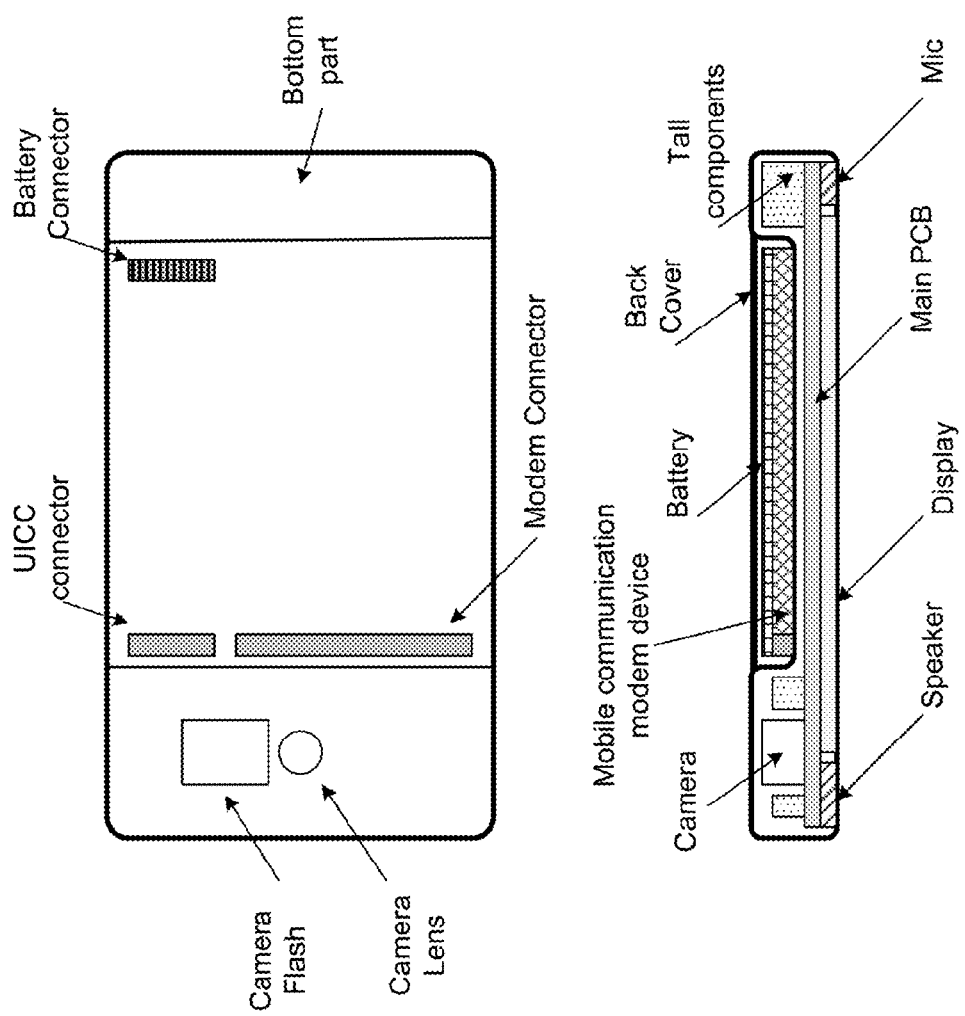
FIG. 1 illustrates that a mobile wireless communication modem device may be installed in or removed from Smartphone-type devices in accordance with aspects of the present invention.

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the invention is not intended to be limited to the specific terms used.

Considering the cost of various components of the end consumer device, the percentage cost of the mobile wireless communication modem is relatively low. For example, in case of a laptop, the laptop may cost anywhere in the range of $500 to $3,000 but the cost of the mobile wireless communication modem is in the range of $50. Similarly, Smartphones also cost in the range of $500 while the cost of mobile wireless communication modem remains in the order of $50. From the user's perspective there is a greater investment in the rest of the consumer device than in the mobile wireless communication modem. Furthermore, due to the presence of lot of information on these devices, changing the entire Smartphone, tablet or laptop is lot more inconvenient than just changing the mobile communication modem. It is difficult to restore or transfer this information easily from one device to another.

A method and apparatus are disclosed that enable the mobile wireless communication modem device as an add-on unit of the consumer electronic device. For instance, the mobile wireless communication modem as an add-on device to a consumer electronic device may communicate with the consumer electronic device though a wired connection or through a wireless connection.

As noted above, there are multiple wireless communication options suitable for different ranges and purposes. Any of these, including Bluetooth, Wi-Fi, 2G, 3G and/or 4G communications technologies, may be employed in the integrated cover and mobile wireless communications modem as described herein.

According to an aspect of the present invention, the mobile wireless communication modem device may be installed in or removed from a Smartphone-type of device as shown in FIG. 1.

Figure 2:
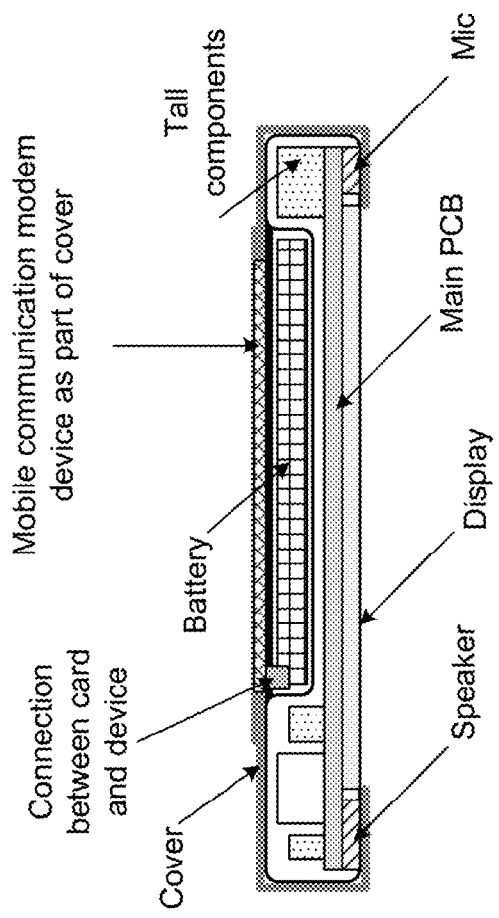
FIG. 2 illustrates a mobile wireless communication modem device may be integrated into the cover for the consumer device such as a Smartphone in accordance with aspects of the present invention.

According to an aspect of the present invention, a mobile wireless communication modem device may be integrated into the cover for the consumer device, such as a Smartphone, as shown in FIGS. 1 and 2. According to another aspect of the invention, the mobile communication modem device in the cover gets the power supply from the primary consumer electronics device such as the Smartphone.

According to another aspect of the invention, the add-on mobile wireless communication modem device communicates with the main processor of the consumer electronics device, such as an Application Processor (AP), using one of the existing short distance wireless technologies such as Bluetooth or Wi-Fi.

According to another aspect of the invention, the add-on mobile wireless communication modem device communicates with the main processor, such as an Application Processor (AP), using one of the wired interfaces such as Universal Serial Bus (USB) interface, High Speed Inter-Chip (HSIC) interface, Secure Digital Input Output (SDIO) interface, etc.

Note that a physical connector is required between the add-on mobile wireless communication modem device and the consumer electronics device for the power supply from the battery pack of the consumer electronics device. This is shown by the connection between the card of the modem device and the battery of the consumer electronics device shown in FIG. 2. In case of a wired interface the connector between add-on mobile wireless communication modem device and the consumer electronics device may include additional signals for relevant wired interface such as USB, SDIO, HSIC, etc. Note that an actual USB connector or other connector may not be required.

FIG. 2 also shows that the cover has a housing shell that wraps around at least part of the consumer electronics device. The wireless communications modem device is integrated within the housing shell. As also shown in FIG. 2, the cover includes a power connector disposed on the housing shell adjacent the wireless communications mobile device. The power connector is configured to provide a power connection between the battery or other power supply of the consumer electronics device and the wireless communications modem device.

According to another aspect of the present invention all the required antennas for the mobile wireless communication modem device may be laid out in the add-on mobile wireless communication modem device depending on the form factor and location of the add-on mobile wireless communication modem device. If the add-on mobile wireless communication modem device may be bigger, the additional space available in the add-on mobile wireless communication modem device compared to the space available inside the consumer electronics device allows more efficient antennas to be used. In case of multiple antennas, the additional space available may enable better spatial diversity and hence improved performance.

According to another aspect of the invention, the electromagnetic interference (EMI) to and from the add-on mobile wireless communication modem device and the main circuit board inside the consumer electronics device is reduced due to physical separation between the add-on mobile wireless communication modem device and primary consumer electronics device.

According to another aspect of the invention, the heat generation from the add-on mobile wireless communication modem device and the main circuit board inside the consumer electronics device is distributed and the dissipation of that heat may be improved which may lead to reduced power consumption and improved user experience.

According to another aspect of the invention, the add-on mobile wireless communication modem device may include a spare battery that becomes available to the consumer electronics device when the add-on mobile wireless communication modem device is attached to it.

According to another aspect of the invention, if the add-on mobile wireless communication modem device includes a battery, the mobile wireless communication modem device may provide service to the end consumer device through short distance wireless technologies such as Bluetooth or Wi-Fi. The add-on mobile wireless communication modem device need not be in immediate vicinity of the consumer electronics device.

According to another aspect of the invention, in case of poor mobile network coverage, such as indoors, the add-on mobile wireless communication modem device with battery pack may be placed near a window or in a spot with better coverage and the user may use the consumer electronics device in a more convenient location within the home or office.

According to another aspect of the invention, the add-on mobile wireless communication modem device with battery enables the primary consumer electronics device to have additional battery capacity while retaining the size (thickness, weight) of the primary consumer electronics device to be lower.

According to another aspect of the invention, the add-on mobile wireless communication modem device with battery pack may include a small display to indicate battery level and mobile network signal level.

According to another aspect of the invention, an add-on mobile wireless communication modem device may include Bluetooth, Wi-Fi, FM Radio, GPS, NFC functionality with or without mobile wireless communication modem.

According to another aspect of the invention the add-on card may take the shape to fit the consumer electronics device to which it expected to connect to. According to an aspect of the present invention the add-on mobile wireless communication modem device may use a flexible PCB to enable it to be wrapped around the consumer electronics device.

The consumer electronics devices that may use this invention may include smartphones, tablets, laptops, gaming consoles, cameras, video camcorders, TV, car entertainment packages, etc.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Aspects of each embodiment may be employed in the other embodiments described herein.

The invention claimed is:

1. A cover for use with a consumer electronics device, the cover comprising:
a housing shell arranged to at least partially wrap around the consumer electronics device, the housing shell being removably affixable to the consumer electronics device;
a wireless communications modem integrally formed with the housing shell, the wireless communications modem configured to enable wireless communication between a processor of the consumer electronics device and a remote network; and
a power connector disposed on the housing shell, the power connector being configured to provide a power connection between a power supply of the consumer electronics device and the wireless communications modem;
wherein the cover further includes a spare battery usable by the consumer electronics device when the housing shell is affixed to the consumer electronics device, and the spare battery is configured to power the wireless communications modem to enable the wireless communications modem to communicate with the processor of the consumer electronics device when the housing shell is not affixed to and is separated from the consumer electronics device.

2. The cover of claim 1, wherein the wireless communication modem is connectable to the processor of the consumer electronics device with a wireless interface.

3. The cover of claim 1, wherein, when the housing shell is affixed to the consumer electronics device, the wireless communication modem is connectable to the processor of the consumer electronics device with a wired interface.

4. The cover of claim 3, wherein the power connector includes signal wires for the wired interface.

5. The cover of claim 1, wherein the wireless communication modem includes one or more antennas disposed along the housing shell.

6. The cover of claim 1, wherein the cover further includes a display to indicate battery level for the spare battery and a mobile network signal level.

7. The cover of claim 1, wherein the wireless communications modem comprises a flexible printed circuit board that fits along the housing shell.

8. A consumer electronics kit, comprising:
a consumer electronics device having a display, one or more audio components, a power source and a processor operatively coupled thereto; and
a cover comprising:
a housing shell arranged to at least partially wrap around the consumer electronics device, the housing shell being removably affixable to the consumer electronics device;
a wireless communications modem integrally formed with the housing shell, the wireless communications modem configured to enable wireless communication between the processor of the consumer electronics device and a remote network; and
a power connector disposed on the housing shell, the power connector being configured to provide a power connection between a power supply of the consumer electronics device and the wireless communications modem;
wherein the cover further includes a spare battery usable by the consumer electronics device when the housing shell is affixed to the consumer electronics device, and the spare battery is configured to power the wireless communications modem to enable the wireless communications modem to communicate with the processor of the consumer electronics device when the housing shell is not affixed to and is separated from the consumer electronics device.

9. The consumer electronics kit of claim 8, wherein the wireless communication modem is connectable to the processor of the consumer electronics device with a wireless interface.

10. The consumer electronics kit of claim 8, wherein, when the housing shell is affixed to the consumer electronics device, the wireless communication modem is connectable to the processor of the consumer electronics device with a wired interface.

11. The consumer electronics kit of claim 10, wherein the power connector includes signal wires for the wired interface.

12. The consumer electronics kit of claim 8, wherein the wireless communication modem includes one or more antennas disposed along the housing shell.

13. The consumer electronics kit of claim 8, wherein the cover further includes a display to indicate battery level for the spare battery and a mobile network signal level.

14. The consumer electronics kit of claim 8, wherein the wireless communications modem comprises a flexible printed circuit board that fits along the housing shell.

15. The consumer electronics kit of claim 8, wherein the consumer electronics device is selected from the group consisting of a smartphone, tablets computer, laptop computer, gaming console, camera, video camcorder, television, and a car entertainment system.

* * * * *